Nov. 15, 1949  J. D. SPALDING  2,488,070
WEIGHT INDICATOR AND DRILLING LINE ANCHOR
Filed Jan. 15, 1945
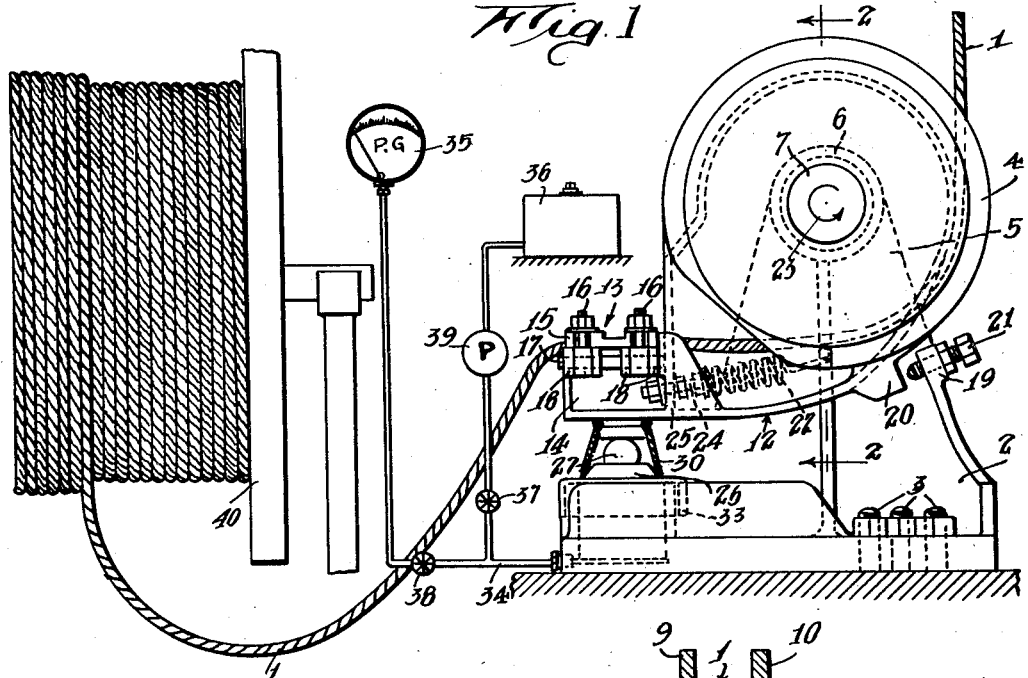
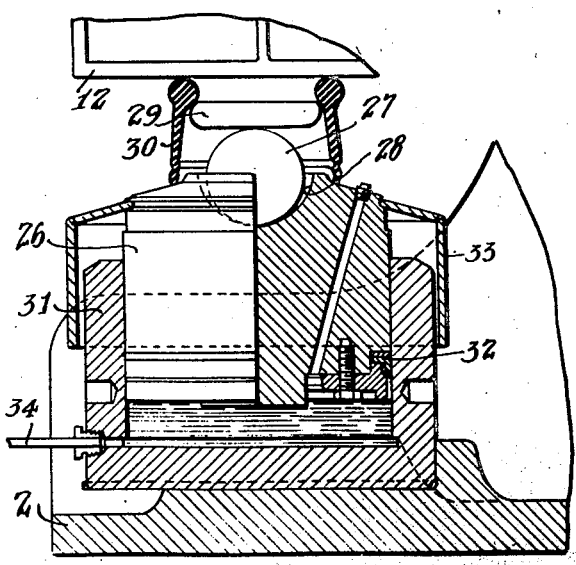
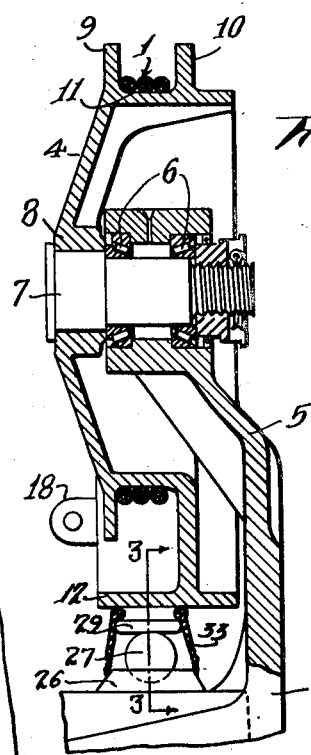
Inventor
John D. Spalding
By Lyon & Lyon
Attorneys Patented Nov. 15, 1949

2,488,070

UNITED STATES PATENT OFFICE 2,488,070

WEIGHT INDICATOR AND DRILLING LINE ANCHOR

John D. Spalding, Los Angeles, Calif., assignor to The National Supply Company, Pittsburgh, Pa., a corporation of Pennsylvania Application January 15, 1945, Serial No. 572,835

9 Claims. (Cl. 73—143)

This invention relates to weight indicators and is more particularly directed to a device for anchoring the dead end of a hoisting line or cable and indicating the line pull imposed upon the line or cable.

In rotary drilling operations it is desirable to know the load or weight being imposed upon the drill bit. This load is usually determined by measuring the total suspended weight of the drill string, and then lowering the drill string until the drill bit rests on bottom and supports a part of the drill string weight. The reduction in amount of suspended weight represents the weight imposed on the bit. The total drill string load on the supporting hook is determined by measuring the tension in the cable or hoisting line that suspends the hook in the derrick. With this knowledge of the load carried by the supporting hook, the driller is enabled to determine the pressure at which the drilling bit is working and to adjust the load to either increase or decrease the pressure as required to obtain maximum drilling efficiency and to avoid overloading which may and many times does result in "twist-offs."

In the patent issued to Edward Timbs, No. 2,282,685, May 12, 1942, for Cable anchor, there is disclosed a tie-down for the dead end of a drilling line or cable which enables a direct line pull to be imposed upon a snubbing drum without imposition of objectional stresses upon the cable clamping means.

It is the object of this invention to improve this former cable anchor and to utilize the advantageous features thereof in combination with an indicating means operating from the snubbing drum to indicate the cable pull or load at the dead end of the drilling line or cable.

Another object of this invention is to provide a weight indicating device operative while utilizing the torque on a cable dead end anchor to indicate the line pull.

Another object of this invention is to provide a combined dead end line anchor and weight indicator wherein the line is wound upon a snubbing drum and the torque thus imparted to the snubbing drum is transmitted to the hydraulic fluid in a cylinder to be registered in a gauge calibrated to read directly the load carried by the supporting element or hook which is supported between the ends of the said cable.

Other objects and advantages of the invention it is believed will be apparent from the hereinafter set forth description of a preferred embodiment of my invention as illustrated in the accompanying drawings.

In the drawings:

Figure 1 is a diagrammatic view of a weight indicator and cable tie-down embodying my invention.

Figure 2 is a sectional view taken substantially on the line 2—2 of Figure 1.

Figure 3 is a sectional view taken substantially on the line 3—3 of Figure 2.

In the preferred embodiment of my invention as illustrated in the accompanying drawing, I indicates a line which is normally a cable and passes over the crown block of a drilling rig and is reeved between the sheaves of such block and the sheaves of a traveling block and has its live end wound upon the reel of a hoist called a drawworks drum. In this practice the traveling block commonly carries a connecting element or hook to which the "drilling" string or pipe is suspended. A drilling bit is carried at the bottom of the pipe and forms the well hole as the pipe is rotated and the pressure or load imposed upon the said bit is regulated by the driller. This load is determined by the driller operating the drawworks drum to lift the drill pipe so that only a part of the pipe weight forms the load on the bit. The foregoing is common drilling procedure and therefore the specific elements of the drilling rig are not illustrated.

The dead end of the line I is suitably anchored in the drilling rig and for this purpose I employ an anchor which is patterned after the anchor of the Timbs Patent No. 2,282,685, modified to incorporate a weight indicating means therein with the minimum of additional parts. Thus the anchor device includes a frame or footing 2 which is secured to the derrick or rig and to the concrete foundation thereof by means of anchoring bolts 3.

A snubbing drum 4 or anchoring element is supported by the footing 2 through the medium of a standard 5, bearings 6 and shaft 7. The shaft 7 is press-fitted into the hub 8 of the drum 4 and is journaled upon the bearings 6.

The snubbing drum 4 is formed with marginal flanges 9 and 10 defining the snubbing surface 11 upon which the table I is wound. The drum 4 is also formed with an integral pressure arm 12 which extends downwardly and outwardly from its lower surface and upon which the cable I is clamped.

The cable clamp 13 may be of any desired form and is herein indicated as including a clamp base 14 formed with the arm 12 and having a cap 15 which is hinged to the base 14 and is adapted to be held down by means of a pair of eye bolts 16 journaled on a shaft 17. The shaft 17 is supported in the eye sections 18 of the base 14. Interposed between the cap 15 and the block 14 are sections or portions of a metal generally softer than the steel of which the cable is composed and between which portions of metal the cable is clamped. This transmits wear from the cable to the softer metal blocks.

Means are provided for limiting the pivotal movement of the drum 4 within the bearings 6, which means may be of any suitable form and are here illustrated as including a stop section 19 formed upon the standard 5 to engage a complementary stop section 20 of the drum 4. A stop screw 21 may be threaded into the stop section 19 to provide an adjustment of the limit of angular travel of the drum 4.

A spring 22 is connected between the arm 12 and standard 5 to avoid free rotation of the drum 4 in a direction opposite to the arrow 23. This spring 22 is connected by means of its attachment bolt 24 to the web 25 of the arm 12 so as to permit limited freedom of movement without spring resistance thereto.

Means are provided for applying the torque transmitted to the arm 12 by the drum 4 in a direct line to the piston 26. As herein illustrated this means includes a ball 27 which is seated in a cavity 28 formed at the end of the piston 26. The ball 27 is engaged by a pressure foot 29 formed upon the under surface of the arm 12. A line thrust is imparted from the arm 12 to the piston 26. As the ball 27 is free to revolve in the enlarged cavity 28, it is desirable to prevent foreign matter from lodging in the cavity; for this purpose a rubber or other flexible hood 30 is snapped onto the foot 29 to engage the upper end of the piston 26 and house the ball 27. The piston 26 is mounted within a hydraulic cylinder 31 supported upon the footing 2. Suitable hydraulic packing 32 is positioned between the piston and cylinder wall. A shroud 33 is carried by the piston 26 and telescopes over the cylinder 31 to prevent foreign matter from lodging between the piston and cylinder.

The hydraulic cylinder 31 is connected with a hydraulic fluid line 34 which leads to a pressure gauge 35 which may be suitably calibrated to indicate directly the weight in pounds which is suspended from the hook (not shown) supported by the cable 1. Connected in the line 34 is indicated a hydraulic fluid reservoir 36 suitably controlled by valves 37 and 38. A pump 39 may be positioned between the reservoir 36 and line 34 to provide for initial cylinder pressure within the range desired in the cylinder 31.

As set forth in the Timbs Patent No. 2,282,685, the dead end of the line or cable 1 is commonly wound upon a reel 40 to enable a renewal of the cable portions which are continuously reaved between the crown and traveling blocks. The clamp provided between the cap 15 and base 14 is easily releasable to permit this rewinding and the paying out of new cable when desired from the reel 40 without in any way disrupting the weight indicating means.

Having fully described my invention, it is to be understood that I do not wish to be limited to the details herein set forth, but my invention is of the full scope of the appended claims.

I claim:

1. In a cable anchor device of the class described, the combination of an anchor footing, a snubbing drum pivotally supported thereby and adapted to receive a plurality of loops of the cable, a pressure arm fixedly secured to the snubbing drum, releasable clamping means on the pressure arm adapted to secure the cable thereto, a piston, means for operatively transmitting torque through said arm from snubbing drum to the piston, a cylinder in which the piston is mounted and means connected with the cylinder for indicating the force transmitted to the piston.

2. In a device of the class described for anchoring and indicating the line pull on the dead end of a hoisting line, the combination of a footing, a snubbing drum pivotally supported by the footing and provided with a drum surface adapted to receive a plurality of loops of the line, a pressure arm operatively connected with the snubbing drum, a piston positioned to be engaged by the pressure arm, a cylinder within which the piston is mounted, gauge means connected with the cylinder to indicate the line pull transmitted by the pressure arm to the piston, and means remote from the drum surface for clamping the cable to the pressure arm.

3. In a device of the class described for anchoring and indicating the line pull on the dead end of a hoisting line, the combination of a footing, a snubbing drum pivotally supported by the footing and provided with a drum surface adapted to receive a plurality of loops of the line, a pressure arm operatively connected with the snubbing drum, a piston positioned to be engaged by the pressure arm, a cylinder within which the piston is mounted, gauge means connected with the cylinder to indicate the line pull transmitted by the pressure arm to the piston, means remote from the drum surface for clamping the cable to the pressure arm, and means for limiting the pivotal movement of the snubbing drum relative to the footing.

4. In a device of the class described for anchoring and indicating the line pull on the dead end of a hoisting line, the combination of a footing, a snubbing drum pivotally supported by the footing and provided with a drum surface adapted to receive a plurality of loops of the line a pressure arm secured to the snubbing drum, releasable clamping means remote from the drum surface adapted to secure the line relative to the snubbing drum, a piston positioned to be engaged by the pressure arm, a cylinder within which the piston is mounted, gauge means connected with the cylinder to indicate the line pull transmitted by the pressure arm to the piston, and spring means mounted between the footing and the pressure arm to resist pivotal movement of the snubbing drum and the pressure arm in a direction opposite to that caused by the line pull.

5. In a device of the class described for anchoring and indicating the line pull on the dead end of a hoisting line, the combination of a footing, a snubbing drum pivotally supported by the footing, a pressure arm operatively connected with the snubbing drum, a piston positioned to be engaged by the pressure arm, a cylinder within which the piston is mounted, gauge means connected with the cylinder to indicate the line pull transmitted by the pressure arm to the piston, spring means mounted between the footing and the pressure arm to resist pivotal movement of the snubbing drum in a direction opposite to that caused by the line pull, and means for clamping the cable to the pressure arm.

6. In a device of the class described, the combination of a stationary element, a cable anchoring element for a cable having a load thereon, said anchoring element having a substantially cylindrical snubbing drum surface disposed tangentially to the direction of the cable pull and of sufficient width to receive a plurality of loops of cable, means for pivotally connecting said elements for pivotal movement of said anchoring element about an axis, means operatively associated with said elements for measuring the cable pull as a function of the turning moment on said anchoring element about said axis, and releasable clamping means for said cable carried by said anchoring element at a position remote from the snubbing drum surface and from the load carrying portion of the cable, said clamping means having engaging portions positioned around the periphery of the cable and being releasable to provide for feeding of said cable through said clamping means.

7. In a device of the class described, the combination of a stationary element, a cable anchoring element for a cable having a load thereon, said anchoring element having a substantially cylindrical snubbing drum surface disposed tangentially to the direction of the cable pull and of sufficient width to receive a plurality of loops of cable, means for pivotally connecting said elements for pivotal movement of said anchoring element about an axis, means operatively associated with said elements for measuring the cable pull as a function of the turning moment on said anchoring element about said axis, said anchoring element having an arm extending outwardly from said axis, and releasable clamping means for said cable carried by said arm at a position remote from the snubbing drum surface and from the load carrying portion of the cable, said clamping means having engaging portions positioned around the periphery of the cable and being releasable to provide for feeding of said cable through said clamping means.

8. In a cable anchoring device, the combination of a stationary element, a non-rotary cable anchoring element for a cable having a load thereon, said anchoring element having a snubbing drum surface disposed tangentially of the direction of the cable pull and of sufficient width to receive a plurality of loops of the cable, pivotal means for connecting said elements for pivotal movement of said anchoring element about an axis, releasable clamping means for said cable carried by the anchoring element at a position remote from the snubbing drum surface and from the load carrying portion of the cable, said clamping means having engaging portions positioned around the periphery of the cable and being releasable to provide for feeding of said cable through said clamping means, and hydraulic means associated with said elements for measuring the cable pull as a function of the turning moment on said anchoring element about said axis.

9. In a well drilling apparatus, a device for anchoring the dead end of a load carrying hoisting cable supporting a drilling string and for indicating the pull upon said cable while providing for readily feeding additional hoisting cable through said device from a cable supply source, said device comprising, a stationary frame, a cable anchoring structure mounted upon said frame for limited pivotal movement about an axis, said anchoring structure including a snubbing drum having a substantially cylindrical snubbing surface disposed tangentially to the direction of cable pull thereon and of sufficient width to receive a plurality of loops of said cable, a cable clamping means carried by said cable anchoring structure at a position remote from said snubbing surface and remote from the load carrying portion of said cable, said clamping means having engaging portions positioned around the periphery of said cable and being releasable to provide for feeding of cable from said cable supply source through said clamping means, and means operatively associated with said cable anchoring structure and said frame for measuring the pull upon said cable as a function of the turning moment of said anchoring structure about said axis.

JOHN D. SPALDING.

REFERENCES CITED

The following references are of record in the file of this patent:

UNITED STATES PATENTS

| Number | Name | Date |
|---|---|---|
| 1,692,057 | Smith et al. | Nov. 20, 1928 |
| 1,991,826 | Taylor | Feb. 19, 1935 |
| 1,995,996 | Moore | Mar. 26, 1935 |
| 2,022,203 | Hughes | Nov. 26, 1935 |
| 2,024,147 | Curtiss | Dec. 17, 1935 |
| 2,025,928 | Wunsch | Dec. 31, 1935 |
| 2,079,021 | Malcolm et al. | May 4, 1937 |
| 2,187,345 | Dinzl | Jan. 16, 1940 |
| 2,210,759 | Hansen | Aug. 6, 1940 |
| 2,282,685 | Timbs | May 12, 1942 |
| 2,352,934 | Bohannan | July 4, 1944 |
| 2,392,702 | Saunders | Jan. 8, 1946 |

FOREIGN PATENTS

| Number | Country | Date |
|---|---|---|
| 404,558 | Germany | Oct. 20, 1924 |